Feb. 2, 1965
R. J. MATHIS
3,168,104
PLUMBING TRAP
Filed Nov. 16, 1962
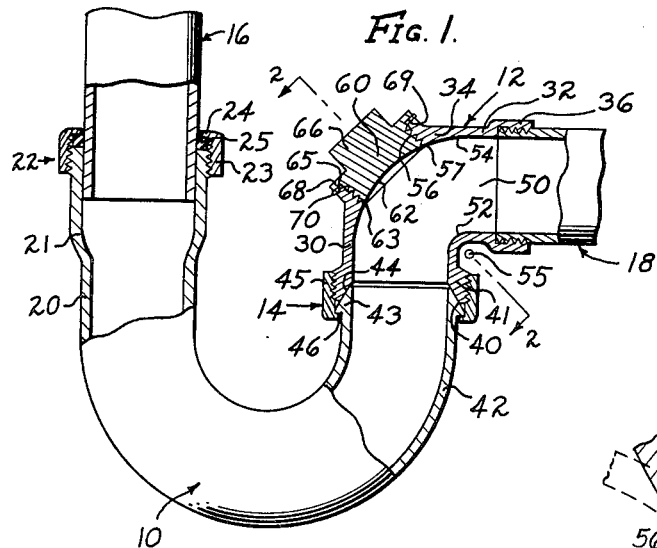
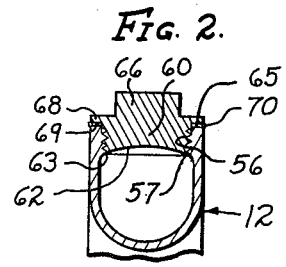
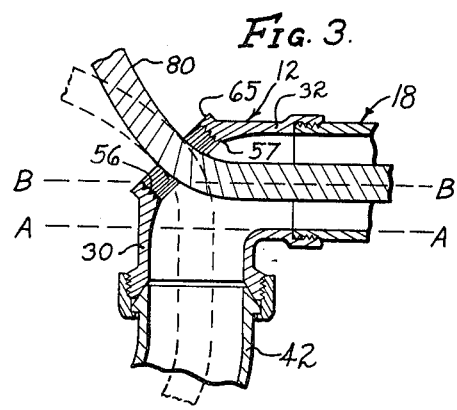
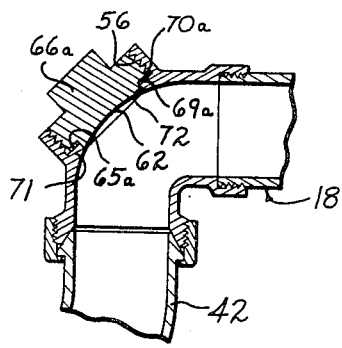
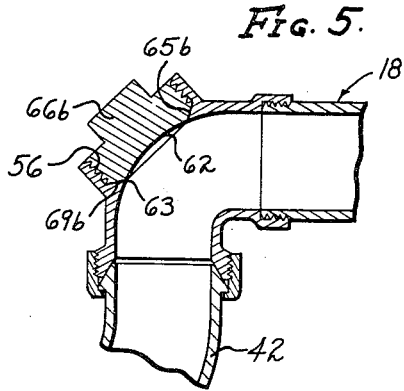
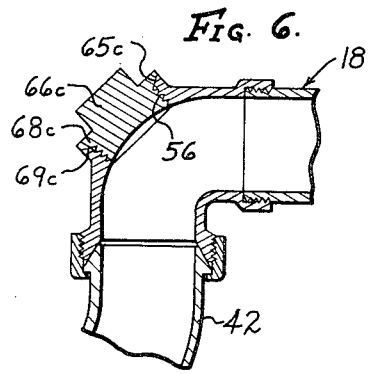
INVENTOR.
RICHARD J. MATHIS
BY HIS ATTORNEYS
HARRIS, KIECH, RUSSELL & KERN United States Patent Office 3,168,104
Patented Feb. 2, 1965

3,168,104
PLUMBING TRAP
Richard J. Mathis, 2140 Sinclair St., Pomona, Calif.
Filed Nov. 16, 1962, Ser. No. 238,157
1 Claim. (Cl. 137—247.51)

This invention relates to plumbing traps adapted to be connected between a tail piece of a plumbing fixture and a drain pipe forming a part of a sewer system. More particularly the invention relates to a two-piece plumbing trap having a trap member and an elbow member pivotally connected by a union fitting. The present application is a continuation-in-part of my copending application Serial No. 57,279, filed September 20, 1960, and now abandoned.

It is an object of the invention to provide a trap including an elbow member having a clean-out opening at the outer crest thereof closed by a removable plug. When this plug is removed a snake or clean-out member can be inserted therethrough to extend either into the trap member or into the drain pipe so that material at either location clogging the drain system can be disloged.

Another object of the invention is to dispose the lowermost portion of the clean-out opening at an elevation a substantial distance above the bottom of the drain pipe or the weir of the elbow member. Still another object is to provide a clean-out opening which is approximately of the same diameter as the internal passages of the elbow member.

Another important object of the invention is to provide a threaded plug for the clean-out opening having a concave inner face merging smoothly with the outermost curved internal surface of the elbow member when the peripheral edge of this concave face is in flush relation with the adjoining annulus of such curved surface. A further and important object is to provide a stop means limiting the inward threading of the plug into the clean-out opening to a position in which such peripheral edge is in such flush relation. Other objects lie in the various structures, to be later described, forming such stop means.

Still further objects of the invention lie in the provision of a plumbing trap having some or all of the features heretofore described and employed in combination with particular joint elements by which the trap can be secured to the tail piece and drain pipe or by which the trap member and elbow member are interconnected in sealed and adjustable relation.

Further objects and advantages will be apparent to those skilled in the art from the following illustration and description of exemplary embodiments.

Referring to the drawing:

FIG. 1 is a vertical sectional view of one embodiment of the plumbing trap of the invention showing the preferred connection to the tail piece of the plumbing fixture and to a horizontal drain pipe;

FIG. 2 is a fragmentary sectional view taken along the 45° plane indicated by the line 2—2 of FIG. 1;

FIG. 3 is a vertical fragmentary sectional view showing the plug removed and the manner in which a plumber's snake can be inserted in either of two directions; and FIGS. 4, 5 and 6 are views similar to FIG. 3 showing alternative forms of stop means within the scope of the invention.

Referring particularly to FIG. 1, the invention includes in general a tubular trap member 10 and a tubular elbow member 12 joined in angularly adjustable relation by a union connection 14. The structure forms compositely a trap or drainage passage from a depending tail piece 16 of a plumbing fixture to a horizontal drain pipe 18 connected to a sewer or other waste-water receiver. The drainage passage is of substantially uniform cross-sectional area throughout the system.

The trap member 10 is preferably J-shaped with its longer upright leg 20 having a flared portion 21 forming a smooth circular passage receiving the smooth circular periphery of the depending tail piece 16 and being detachably connected thereto by a slip-joint connection 22. The latter includes an annular nut 23 around the tail piece having internal threads engaging the externally threaded upper end of the leg 20. The annular nut 23 provides an inwardly-formed flange 24. A sealing ring 25 of resilient material is compressed between the flange 24 and the upper end of the leg 20 when the nut 23 is tightened, such tightening deforming the ring 25 into sealing relation with the smooth circular periphery of the tail piece 16.

The elbow member 12 provides a depending portion 30, a horizontal portion 32 and an intervening knee portion 34. The horizontal portion 32 terminates in an internally threaded enlargement 36 receiving the threaded end of the horizontal drain pipe 18.

The circular interior of the depending portion 30 terminates in a downwardly-flaring conical face 40 within an externally threaded enlargement 41. The shorter upright leg 42 of the trap member 10 provides a shouldered enlargement or end portion 43 having an upwardly converging end face 44, preferably conical and formed at substantially the same angle as the conical face 40 of the depending portion 30 of the elbow member 12. An internally-threaded union member 45 provides an inwardly extending flange 46 extending beneath the shoulder of the end portion 43. Tightening of the union member 45 thus clamps the flaring and converging surfaces together in sealing relationship. The seal at this point is preferably between the metal surfaces of the members 10 and 12 without intervening washers or packing.

The tubular elbow member 12 provides a smooth interior passageway 50 extending throughout the depending, horizontal and knee portions 30, 32 and 34. Within the knee portion 34 this interior passageway is bounded inwardly by an inner curved surface 52 of relatively small radius. Likewise this passageway is bounded outwardly by an outer curved surface 54 of relatively large radius. The curved surfaces 52 and 54 are primarily in the knee portion 34 but merge smoothly into the circular interiors of the depending and horizontal portions 30 and 32. In the central midplane of the elbow member 12 the curved surfaces 52 and 54 are substantially quadrants of circles formed about a center 55. Even if thus not exactly concentric it is important that the curved surfaces 52 and 54 be substantially uniformly spaced from each other in the vertical midplane to provide a waterway of substantially uniform width in such plane.

The outer curved surface 54 is interrupted by a threaded clean-out opening 56 through the knee portion 34, preferably through a thickened wall thereof at the outer crest of the elbow member. This clean-out opening 56 is preferably of a diameter substantially equal to the diameters of the circular passages of the depending and horizontal portions 30 and 32. In practice the diameter of the opening 56 is preferably about 85–100% of the diameter of each such circular passage, being thus of substantially the same diameter. The innermost end of the opening 56 thus ends in a circular edge or annulus 57 at the outer curved surface 54. As shown, this annulus is planar with all portions thereof lying in a plane at right angles to the central axis of the clean-out opening 56. To effect this the cross section of the passageway 50 is slightly U-shaped adjacent this axis as viewed in FIG. 2, having upper shoulders merging toward the annulus 57. The central axis of the clean-out opening 56 is approximately 45° from the central axes of the circular passages of the depending and horizontal portions 30 and 32.

An externally threaded clean-out plug 60 removably closes the clean-out opening 56. It is an important feature of the invention that this plug provide a concave inner face 62. As shown, this concave inner face terminates in a planar peripheral edge 63 having all of its portions lying in a plane at right angles to the central axis of the clean-out opening 56 and the central axis of plug 60, the concave inner face 62 being dished spherically and being of sphero-concave shape. The curvature of this face 62 in the vertical midplane of the elbow member 12 is substantially the same as the curvature of the outer curved surface 54 to blend smoothly with the annulus 57. Likewise in a plane transverse to the midplane passing through the center 55, as in FIG. 2, the curvature of the concave inner face 62 blends smoothly with the aforesaid shoulder merging toward the annulus 57. Correspondingly, when the peripheral edge 63 of the concave inner face 62 is in flush relation with the edge or annulus 57 there are no projections extending into the flow passage or waterway and substantially no spaces opening thereon which would tend to impede the flow or collect or snag threads, hairs or other foreign material carried by the flow. By maintaining the aforesaid flush relation the trap of the invention is self-cleaning.

It is likewise important to the invention that this flush relation be maintained both initially and after repeated removals of the plug 60. For this purpose the invention provides a stop means limiting the inward threading of the plug 60 into the clean-out opening 56 to a position in which the peripheral edge 63 of the plug is in such flush relation with the annulus 57 of the outer curved surface 54. This stop means may be variously formed, as suggested in FIGS. 1, 4, 5 and 6. In all such embodiments the knee portion 34 provides an annular face pressurally engaged by a shoulder of the plug.

In the embodiment of FIGS. 1 and 2 the outer crest of the knee portion 34 provides a flat annular face 65 at the extreme outer surface of the elbow member. The plug 60 provides a wrench-receiving portion 66, preferably with flats for engagement by a suitable wrench. The particular size of this wrench-receiving portion is not critical to the invention. Between this wrench-receiving portion and the threaded portion of the plug is a flange 68 overlying the flat annular face 65 and providing a shoulder 69 limiting the insertion of the plug to the aforesaid flush relation. A sealing washer 70 is preferably interposed between the flat shoulder 69 and the flat annular face 65. This washer is preferably made of soft metal and is of such thickness that when the plug 60 is tightened the annular edge 53 will lie in the aforesaid flush relation with the annulus 57.

In the embodiment of FIG. 4 the flat annular face is within the clean-out opening 56 near the inner end thereof, being indicated by the numerals 65a and being formed by an inwardly directed shoulder 71 which extends to a circular opening 72 of the elbow member. The wrench-receiving portion 66a of the plug is then immediately adjacent the threaded portion thereof. The latter provides an inwardly projecting circular portion extending into and substantially filling the circular opening 72. The concave inner face 62 is at the inner end of this circular portion. A flat shoulder 69a is formed at the junction of the threaded and circular portions. A sealing washer 70a of soft metal is compressed between this shoulder and the flat annular face 65a to determine the aforesaid flush relation.

In the embodiment of FIG. 5 the elbow member provides a conical annular face 65b converging inwardly and positioned near the inner end of the clean-out opening 56. The wrench-receiving portion 66b is immediately outward of the threaded portion of the plug and the latter provides the concave inner face 62. The inner portion of the plug provides a conical shoulder 69b engaging the conical face 65b to limit the insertion of the plug and establish the aforesaid flush relation. The peripheral edge 63 is here at the junction of the shoulder 69b and the concave inner face 62 of the plug. No sealing washer is interposed between the shoulder 69b and the conical annular face 65b in this embodiment of the invention but such a washer can be employed if desired.

In the embodiment of FIG. 6 the conical annular face 65c is at the outermost portion of the clean-out opening 56 and converges inwardly. The corresponding conical shoulder 69c is formed on the flange 68c of the plug between the threaded portion of the plug and the wrench-receiving portion 66c thereof. As in FIG. 5 the shoulder 69c and the conical annular face 65c are preferably in surface engagement to determine the aforesaid flush relationship although a conical sealing washer can be interposed if desired.

If there is no blockage in the horizontal drain pipe 18 or therebeyond the normal level of the trap liquid will be as indicated by A—A in FIG. 3. If such blockage does occur the liquid level in the horizontal drain pipe 18 may rise to the level B—B or even above. Should any blockage occur anywhere in the system the plug 60 is removed. If the level is at B—B or above it is a definite indication that the blockage is in the horizontal drain pipe 18 or therebeyond. In this event a plumber's snake 80 may be inserted through the clean-out opening 56 to extend along and beyond the horizontal drain pipe 18 to clear the obstruction. When cleared the level will drop to A—A. Should the level be at A—A when the plug 66 is removed it will be apparent that blockage is in the trap member 10 or the tail piece 16. In this event the snake 80 can be inserted in its dotted line position of FIG. 3 to extend along the trap member and the tail piece to clear the obstruction. In FIG. 3 the level B—B is at the lowermost portion of the clean-out opening 56 and it is desirable that this level be substantially above the level A—A or the weir formed by the top of the inner curved surface 52. This is desirable both to avoid drainage of backed-up material through the opening 56 and to permit observation of the water level in determining where the blockage has occurred.

Various changes and modifications can be made without departing from the spirit of the invention as defined in the appended claim.

I claim:

A plumbing trap adapted to be connected between a depending tail piece of a plumbing fixture and a horizontal drain pipe, said plumbing trap including in combination:

(1) a J-shaped trap member having upright legs of different length;

(2) a connection at the top of the longer upright leg adapted to receive said depending tail pipe, there being a union connection at the top of the shorter upright leg;

(3) a tubular elbow member having a depending portion and a horizontal portion joined by a knee portion, said portions defining a smooth interior passageway bounded inwardly by a relatively-small-radius inner curved surface of said knee portion and outwardly by a relatively-large-radius outer curved surface of said knee portion, said depending and horizontal portions providing circular passages having circular interiors of equal diameter, said curved surfaces merging into the circular interiors of said depending and horizontal portions, said curved surfaces being spaced substantially uniformly from each other in the vertical midplane of said knee portion to provide a waterway of substantially uniform width in such plane, said outer curved surface being interrupted by a threaded clean-out opening through said knee portion of a diameter substantially equal to said circular passages and intersecting said outer curved surface in an edge forming an annulus with all portions thereof lying in a plane transverse to the central axis of said clean-out opening, said outer curved surface extending uninterruptedly to said threaded clean-out opening, the central axis of said clean-out opening being in said vertical midplane at an angle of approximately 45° from the central axes of said circular passages, said knee portion being substantially U-shaped in cross section in a transverse plane including said central axis of said clean-out opening with upper shoulders at the top of such U-shaped cross section merging toward said annulus, said shorter upright leg of said elbow member being connected to said depending portion of said elbow member by said union connection;

(4) an externally threaded clean-out plug removably threaded into said clean-out opening, said plug having a sphero-concave inner face terminating in a planar peripheral edge, all portions of said peripheral edge lying in a plane at right angles to the central axis of said plug, said inner face being of the same curvature in said vertical midplane as said outer curved surface when said peripheral edge is in a flush relation with said annulus, all portions of said sphero-concave surface adjacent said peripheral edge merging smoothly into the curve of said outer curved surface when said peripheral edge is in said flush relation whereby said sphero-concave surface presents with the flush outer curved surface a smooth continuation of said interior passageway free of projections; and (5) a shouldered stop means sealing the interthread space and limiting the inward threading of said plug into said clean-out opening to a position in which said peripheral edge of said plug is in said flush relation with said annulus of said outer curved surface.

References Cited by the Examiner
UNITED STATES PATENTS

| | | | |
|---|---|---|---|
| 441,691 | 12/90 | McClellan | 137—247.49 |
| 577,343 | 2/97 | Barry | 137—247.51 |
| 607,983 | 7/98 | Cooper | 285—127 X |
| 634,250 | 10/99 | Tudor | 285—127 X |
| 1,016,342 | 2/12 | Lyons | 137—247.43 |
| 1,112,136 | 9/14 | Hayes | 220—39 |
| 1,398,822 | 11/21 | Bonham | 220—39 |
| 1,913,677 | 6/33 | Kinzel | 220—46 |
| 1,992,793 | 2/35 | Welter | 220—39 |
| 2,037,625 | 4/36 | Goepel | 137—247.51 X |
| 2,130,196 | 9/38 | Sakier | 4—166 |
| 2,404,259 | 7/46 | Veitch | 285—127 |
| 2,766,461 | 10/56 | Zinkil | 4—170 |
| 2,801,023 | 7/57 | Baker | 220—39 |

ISADOR WEIL, *Primary Examiner.*